United States Patent
Coleman

(10) Patent No.: US 10,240,686 B2
(45) Date of Patent: Mar. 26, 2019

(54) METHODS AND APPARATUS FOR CONDUCTING IN-SERVICE TESTING OF PNEUMATIC SIGNAL AMPLIFIERS

(71) Applicant: Fisher Controls International LLC, Marshalltown, IA (US)

(72) Inventor: Afton Renee Coleman, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 146 days.

(21) Appl. No.: 15/240,390

(22) Filed: Aug. 18, 2016

(65) Prior Publication Data

US 2018/0051823 A1 Feb. 22, 2018

(51) Int. Cl.
F16K 37/00 (2006.01)

(52) U.S. Cl.
CPC ............ *F16K 37/005* (2013.01); *F16K 37/00* (2013.01); *F16K 37/0066* (2013.01)

(58) Field of Classification Search
CPC .......................... F16K 37/005; F16K 37/0066
USPC ......................................................... 702/183
See application file for complete search history.

(56) References Cited

U.S. PATENT DOCUMENTS 4,157,656 A * 6/1979 Walle .................. G01M 3/3263
73/49.2
7,621,293 B2 11/2009 Snowbarger 2004/0045603 A1* 3/2004 McCarty .................. F16K 1/123
137/219
2005/0061375 A1* 3/2005 Baumann ................. F16K 3/267
137/625.39
2006/0219299 A1* 10/2006 Snowbarger ........ F16K 37/0091
137/487.5
2009/0000406 A1* 1/2009 Brazier ............... F16K 17/1626
73/865.8

(Continued)

OTHER PUBLICATIONS

Fisher Controls International LLC, "Fisher™ 2625, 2625SST, and 2625NS Volume Boosters," Product Bulletin 62.3:2625, D200071X012, Mar. 2016, 8 pages.

(Continued)

*Primary Examiner* — Eman A Alkafawi
(74) *Attorney, Agent, or Firm* — Hanley, Flight & Zimmerman, LLC

(57) ABSTRACT

Methods and apparatus for conducting in-service testing of a pneumatic signal amplifier are disclosed. In response to a test initiation signal, a processor of a valve controller operatively coupled to the pneumatic signal amplifier supplies a pressurized control fluid to an inlet of the pneumatic c signal amplifier. The processor determines a first pressure value corresponding to an inlet pressure of the pressurized control fluid at the inlet of the pneumatic signal amplifier, and further determines a second pressure value corresponding to an outlet pressure of the pressurized control fluid at an outlet of the pneumatic signal amplifier. The processor determines a ratio value between the first and second pressure values and determines whether the ratio value satisfies a threshold. In response to determining that the ratio value satisfies the threshold, the processor generates a notification indicating that the pneumatic signal amplifier is functional.

20 Claims, 4 Drawing Sheets

(56) References Cited

U.S. PATENT DOCUMENTS

2010/0152908 A1    6/2010  Meier et al.

OTHER PUBLICATIONS

Fisher Controls International LLC, "Fisher VBL Volume Booster," Product Bulletin 62.3:VBL, Mar. 2010, 8 pages.
International Searching Authority, "International Search Report and Written Opinion," issued in connection with International Patent Application No. PCT/US2017/047046, dated Nov. 10, 2017, 12 pages.

* cited by examiner

METHODS AND APPARATUS FOR CONDUCTING IN-SERVICE TESTING OF PNEUMATIC SIGNAL AMPLIFIERS

FIELD OF THE DISCLOSURE

This disclosure relates generally to pneumatic signal amplifiers and, more particularly, to methods and apparatus for conducting in-service testing of pneumatic signal amplifiers.

BACKGROUND

Large or high friction valves often require the use of a pneumatic signal amplification device such as a volume booster to obtain faster valve stroking speeds. Such pneumatic signal amplification devices may be utilized in control valves as well as on-off valves. When a valve utilizing a pneumatic signal amplification device is not exercised (e.g., opened or closed) frequently, it is often unknown whether the pneumatic signal amplification device is able to function properly to stroke the valve at the desired speed. Whether the pneumatic signal amplification device is able to stroke the valve at the desired speed is often determinative as to whether a safety function of the valve is satisfied, particularly in instances where the valve is implemented as an emergency shutdown (ESD) valve and/or where the valve is implemented as part of a safety instrumented system (SIS).

In known valve systems utilizing a pneumatic signal amplification device, testing of the pneumatic signal amplification device may be conducted upon taking the pneumatic signal amplification device and/or the valve out of service. In addition to being inconvenient, the process of taking the pneumatic signal amplification device and/or the valve out of service may also result in the pneumatic signal amplification device and/or valve being unable to perform their intended functions when needed, such as in the case of an emergency requiring the valve to be rapidly exercised without delay.

SUMMARY

Example methods and apparatus for conducting in-service testing of pneumatic signal amplifiers are described. An example method for conducting in-service testing of a pneumatic signal amplifier operatively coupled to a valve controller and to an actuator includes supplying, by executing one or more instructions with a processor of the valve controller in response to a test initiation signal, a pressurized control fluid to an inlet of the pneumatic signal amplifier. The method includes determining, by executing one or more instructions with the processor, a first pressure value of the pressurized control fluid. The first pressure value corresponds to an inlet pressure of the pressurized control fluid at the inlet of the pneumatic signal amplifier. The method includes determining, by executing one or more instructions with the processor, a second pressure value of the pressurized control fluid. The second pressure value corresponds to an outlet pressure of the pressurized control fluid at an outlet of the pneumatic signal amplifier. The method includes determining, by executing one or more instructions with the processor, a ratio value between the first and second pressure values. The method includes determining, by executing one or more instructions with the processor, whether the ratio value satisfies a threshold. The method includes, in response to determining that the ratio value satisfies the threshold, generating, by executing one or more instructions with the processor, a notification indicating that the pneumatic signal amplifier is functional.

An example apparatus for conducting in-service testing of a pneumatic signal amplifier includes a valve controller configured to be operatively coupled to the pneumatic signal amplifier and to an actuator. The valve controller includes a processor configured to supply a pressurized control fluid to an inlet of the pneumatic signal amplifier in response to a test initiation signal. The processor is configured to determine a first pressure value of the pressurized control fluid. The first pressure value corresponds to an inlet pressure of the pressurized control fluid at the inlet of the pneumatic signal amplifier. The processor is configured to determine a second pressure value of the pressurized control fluid. The second pressure value corresponds to an outlet pressure of the pressurized control fluid at an outlet of the pneumatic signal amplifier. The processor is configured to determine a ratio value between the first and second pressure values. The processor is configured to determine whether the ratio value satisfies a threshold. The processor is configured to, in response to determining that the ratio value satisfies the threshold, generate a notification indicating that the pneumatic signal amplifier is functional.

An example tangible machine-readable storage medium includes instructions that, when executed, cause a processor of a valve controller to supply a pressurized control fluid to an inlet of a pneumatic signal amplifier in response to a test initiation signal. The pneumatic signal amplifier is operatively coupled to the valve controller and to an actuator. The instructions cause the processor to determine a first pressure value of the pressurized control fluid. The first pressure value corresponds to an inlet pressure of the pressurized control fluid at the inlet of the pneumatic signal amplifier. The instructions cause the processor to determine a second pressure value of the pressurized control fluid. The second pressure value corresponds to an outlet pressure of the pressurized control fluid at an outlet of the pneumatic signal amplifier. The instructions cause the processor to determine a ratio value between the first and second pressure values. The instructions cause the processor to determine whether the ratio value satisfies a threshold. The instructions cause the processor to, in response to determining that the ratio value satisfies the threshold, generate a notification indicating that the pneumatic signal amplifier is functional.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Unlike known valve systems in which the testing of a pneumatic signal amplification device of the valve system may only be conducted upon taking the pneumatic signal amplification device and/or a valve of the valve system out of service, the methods, apparatus and systems disclosed herein advantageously provide the ability to conduct in-service testing of a pneumatic signal amplifier of a valve system. As a result, the costs, inconveniences and other difficulties associated with taking the pneumatic signal amplifier and/or a valve of the valve system out of service, as would typically be required when testing the functionality of the pneumatic signal amplifier, are avoided. As used herein, the term "in-service test" or "in-service testing" means a test and/or testing conducted on one or more component(s) of a valve system (e.g., a valve, an actuator, a pneumatic signal amplifier, etc.) without shutting down and/or taking the component(s) and/or, more generally, the valve system, out of service. An example of an in-service test of a valve system is a partial stroke test (PST).

Figure 1:
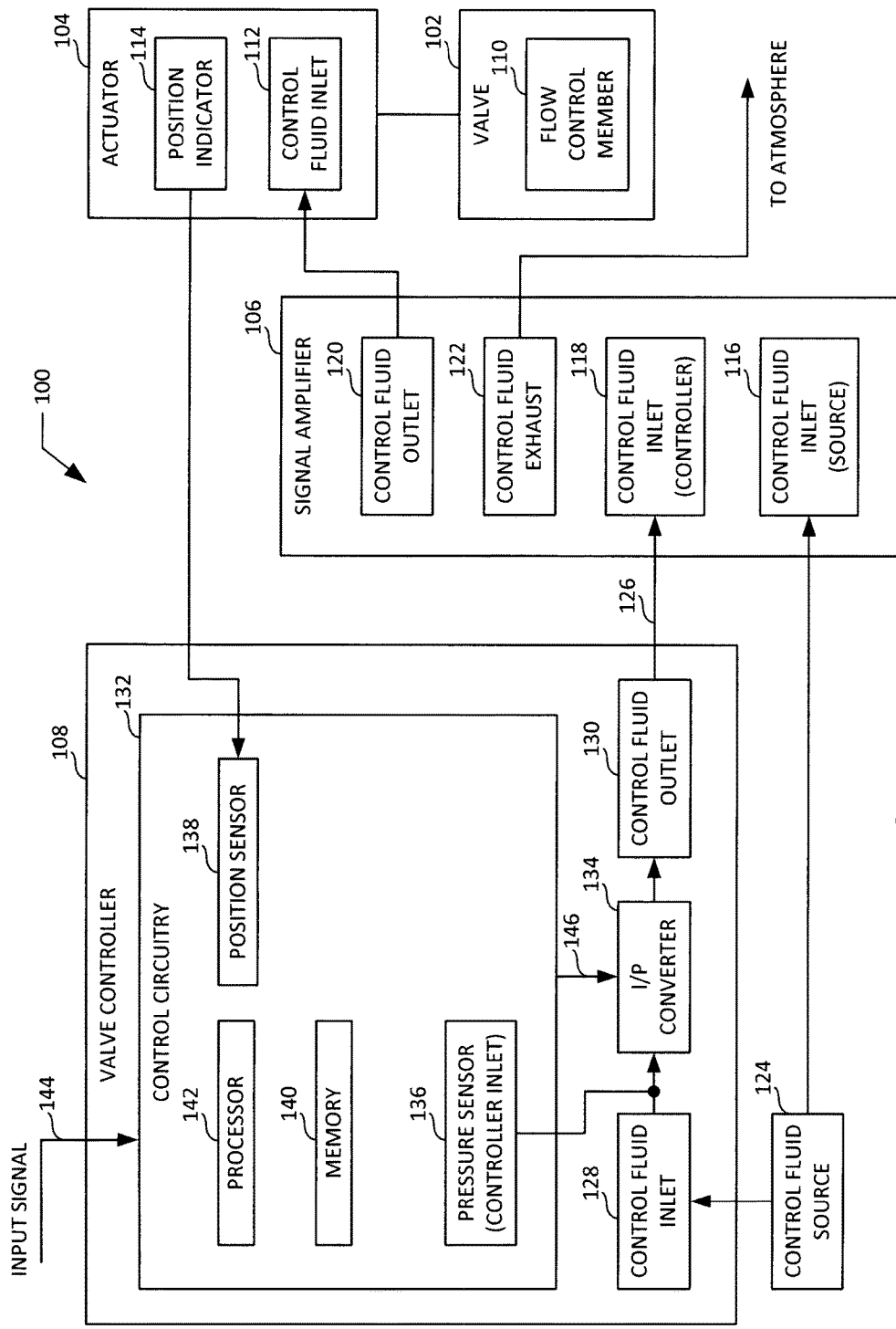
FIG. 1 is a block diagram of a known valve system.

FIG. 1 illustrates a known valve system 100 including a valve 102, an actuator 104, a pneumatic signal amplifier 106 and a valve controller 108. The valve 102 of FIG. 1 may be any type of control valve and/or on-off valve including, for example, a globe valve, a ball valve, a butterfly valve, or an angle valve. The valve 102 includes a flow control member 110 and a valve shaft (not shown). The flow control member 110 is operatively coupled to the valve shaft. Upon the application of a force and/or load to the valve shaft, the flow control member 110 moves between an open position of the valve 102 and a closed position of the valve 102.

The actuator 104 of FIG. 1 is a single-acting pneumatic actuator. The actuator 104 may be either a diaphragm actuator or a piston actuator. The actuator 104 is operatively coupled to the valve 102 and, more specifically, to the valve shaft of the valve 102. The actuator 104 includes a control fluid inlet 112, a position indicator 114 and an internal stem and/or piston (not shown).

The control fluid inlet 112 of the actuator 104 receives a pressurized control fluid (e.g., pressurized air) that causes the stem and/or piston of the actuator 104 to translate in a direction along a longitudinal axis of the actuator 104. A force and/or load generated by the translating stem and/or piston is transformed into a force and/or load on the valve shaft, which causes the flow control member 110 to move between an open position of the valve 102 and a closed position of the valve 102, as described above. The operative coupling of the stem and/or piston of the actuator 104 to the valve shaft and/or the flow control member 110 of the valve 102 results in a correlation between the position of the stem and/or piston of the actuator 104 and the position of the flow control member 110 of the valve 102. Accordingly, a position of the flow control member 110 of the valve 102 may be determined based on a known and/or measured position of the stem and/or piston of the actuator 104, and vice-versa.

The position indicator 114 of the actuator 104 is operatively coupled to the stem and/or piston of the actuator 104 such that movement of the stem and/or piston results in corresponding movement of the position indicator 114. As discussed above, a correlation exists between the position of the stem and/or piston of the actuator 104 and the position of the flow control member 110 of the valve 102. Thus, the position indicator 114 may provide an indication of the position of the stem and/or piston of the actuator 104 and/or an indication of the position of the flow control member 110 of the valve 102.

The pneumatic signal amplifier 106 of FIG. 1 is a volume booster. The pneumatic signal amplifier 106 is operatively coupled to the actuator 104 and to the valve controller 108. The pneumatic signal amplifier 106 may amplify a pneumatic input control signal received from the valve controller 108 to increase the speed at which the stem and/or piston of the actuator 104 moves and/or strokes to open and/or close the flow control member 110 of the valve 102.

The pneumatic signal amplifier 106 of FIG. 1 includes a first control fluid inlet 116, a second control fluid inlet 118, a control fluid outlet 120 and a control fluid exhaust 122. The first control fluid inlet 116 of the pneumatic signal amplifier 106 receives a pressurized control fluid (e.g., pressurized air) from a pressurized control fluid source 124. The pneumatic signal amplifier 106 may include a supply port (not shown) that, when in a closed position, prevents the pressurized control fluid received via the first control fluid inlet 116 of the pneumatic signal amplifier 106 from flowing into and/or through the pneumatic signal amplifier 106. The second control fluid inlet 118 of the pneumatic signal amplifier 106 receives a pressurized control fluid (e.g., pressurized air) from the valve controller 108. The control fluid outlet 120 of the pneumatic signal amplifier 106 supplies a pressurized control fluid (e.g., pressurized air) to the control fluid inlet 112 of the actuator 104. The control fluid exhaust 122 of the pneumatic signal amplifier 106 vents excess pressurized control fluid to the atmosphere. The pneumatic signal amplifier 106 may include an exhaust port (not shown) that, when in a closed position, prevents the pressurized control fluid from flowing out of the control fluid exhaust 122 of the pneumatic signal amplifier 106.

The pressurized control fluid received by the second control fluid inlet 118 of the pneumatic signal amplifier 106 functions as an input control signal 126 for the pneumatic signal amplifier 106. A large, sudden change in the input control signal 126 received by the pneumatic signal amplifier 106 (e.g., a large, sudden change in the pressure of the pressurized control fluid received by the second control fluid inlet 118 of the pneumatic signal amplifier 106) creates a pressure differential between the pressure of the pressurized control fluid received by the second control fluid inlet 118 of the pneumatic signal amplifier 106 and the pressure of the pressurized control fluid supplied by the control fluid outlet 120 of the pneumatic signal amplifier 106. When such a pressure differential occurs, diaphragms not shown) of the pneumatic signal amplifier 106 move to open either the supply port (not shown) in fluid communication with the first control fluid inlet 116 of the pneumatic signal amplifier 106 or the exhaust port (not shown) in fluid communication with the control fluid exhaust 122 of the pneumatic signal amplifier 106, depending upon which action is required to reduce the pressure differential.

For example, if the pressure differential results from a large, sudden increase in the input control signal 126 received by the second control fluid inlet 118 of the pneumatic signal amplifier 106, the supply port of the pneumatic signal amplifier 106 opens to allow the pressurized control fluid received via the first control fluid inlet 116 of the pneumatic signal amplifier 106 to flow into the pneumatic signal amplifier 106, thereby increasing the pressure of the pressurized control fluid supplied by the control fluid outlet 120 of the pneumatic signal amplifier 106. Once opened, the supply port remains open until the pressure differential between the pressure of the pressurized control fluid received by the second control fluid inlet 118 of the pneumatic signal amplifier 106 and the pressure of the pressurized control fluid supplied by the control fluid outlet 120 of the pneumatic signal amplifier 106 returns to within a threshold (e.g., a deadband) defined by the pneumatic signal amplifier 106. This process enables the pneumatic signal amplifier 106 to increase the speed at which the stem and/or piston of the actuator 104 moves and/or strokes to open and/or close the flow control member 110 of the valve 102.

As another example, if the pressure differential results from a large, sudden decrease in the input control signal 126 received by the second control fluid inlet 118 of the pneumatic signal amplifier 106, the exhaust port of the pneumatic signal amplifier 106 opens to allow excess pressurized control fluid to be vented into the atmosphere via the control fluid exhaust 122 of the pneumatic signal amplifier 106, thereby decreasing the pressure of the pressurized control fluid supplied by the control fluid outlet 120 of the pneumatic signal amplifier 106. Once opened, the exhaust port remains open until the pressure differential between the pressure of the pressurized control fluid received by the second control fluid inlet 118 of the pneumatic signal amplifier 106 and the pressure of the pressurized control fluid supplied by the control fluid outlet 120 of the pneumatic signal amplifier 106 returns to within a threshold (e.g., a deadband) defined by the pneumatic signal amplifier 106. This process enables the pneumatic signal amplifier 106 to increase the speed at which the stem and/or piston of the actuator 104 moves arid/or strokes to open and/or close the flow control member 110 of the valve 102.

The valve controller 108 of FIG. 1 is a digital valve controller. The valve controller 108 is operatively coupled to the pneumatic signal amplifier 106 to control the supply of pressurized control fluid and/or the input control signal 126 to the pneumatic signal amplifier 106. The valve controller 108 is also operatively coupled to the actuator 104 to receive a position indication provided by the position indicator 114 of the actuator 104. The valve controller 108 includes a control fluid inlet 128 that receives a pressurized control fluid (e.g., pressurized air) from the pressurized control fluid source 124. The valve controller 108 further includes a control fluid outlet 130 that supplies the pressurized control fluid and/or the input control signal 126 to the second control fluid inlet 118 of the pneumatic signal amplifier 106.

The valve controller 108 of the known valve system 100 further includes control circuitry 132 and a current-to-pressure (I/P) converter 134. The control circuitry 132 includes and/or is operatively coupled to a controller inlet pressure sensor 136, a position sensor 138, memory 140 and a processor 142. The controller inlet pressure sensor 136 senses, measures and/or detects the pressure of the pressurized control fluid supplied by the control fluid source 124 to the control fluid inlet 128 of the valve controller 108. The position sensor 138 is operatively coupled to the position indicator 114 of the actuator 104. The position sensor 138 senses, measures and/or detects the position of the flow control member 110 of the valve 102 and/or the position of the stern and/or piston of the actuator 104 based on the position indication provided by the position indicator 114. In some examples, the operative coupling between the position sensor 138 and the position indicator 114 may take the form of a mechanical linkage connecting the position indicator 114 to the position sensor 138. In other examples, the operative coupling may be electronic. In some such other examples, the operative coupling may be implemented via a magnet array and one or more Hall effect sensors.

Data and/or information obtained from and/or provided by the controller inlet pressure sensor 136 and/or the position sensor 138 may be stored in the memory 140 of FIG. 1. The memory 140 may be implemented by any type(s) and/or any number(s) of storage device(s) such as a storage drive, a flash memory, a read-only memory (ROM), a random-access memory (RAM), a cache and/or any other storage medium in which information is stored for any duration (e.g., for extended time periods, permanently, brief instances, for temporarily buffering, and/or for caching of the information). The information stored in the memory 140 may be stored in any file and/or data structure format, organization scheme, and/or arrangement.

The processor 142 of FIG. 1 may access data and/or information from the memory 140, or may alternatively receive data and/or information directly from the controller inlet pressure sensor 136 and/or the position sensor 138. The processor 142 may be implemented by a semiconductor device such as a microprocessor, controller or microcontroller. The processor 142 manages and/or controls the operation of the control circuitry 132, and/or, more generally, the operation of the valve controller 108.

The processor 142, and/or, more generally, the control circuitry 132 receives an input signal 144 corresponding to a desired position and/or condition of the flow control member 110 of the valve 102. For example, the input signal 144 may indicate that the flow control member 110 of the valve 102 is to be zero percent (0%) open (i.e., one hundred percent (100%) closed). In response to receiving the input signal 144, the control circuitry 132, via the processor 142, determines the current pressure associated with the controller inlet pressure sensor 136, and further determines the current position of the flow control member 110 based on the current position associated with the position sensor 138. Based on such data and/or information, the control circuitry 132, via the processor 142, generates a drive signal 146 corresponding to a change in position of the stem and/or piston of the actuator 104 and/or to a change in position of the flow control member 110 of the valve 102 to place the flow control member 110 at the desired position indicated by the input signal 144. The drive signal 146 is a variable current that changes based on continuous feedback obtained from and/or provided by the controller inlet pressure sensor 136 and/or the position sensor 138.

The variable current drive signal 146 generated by the control circuitry 132 is transmitted to the I/P converter 134. In addition to receiving the drive signal 146, the I/P converter 134 also receives the pressurized control fluid supplied through the control fluid inlet 128 of the valve controller 108. In response to receiving the drive signal 146 and the pressurized control fluid, the I/P converter 134 generates a variable pressure corresponding to the variable current drive signal 146. The variable pressure generated by the I/P converter 134 is supplied to the control fluid outlet 130 of the valve controller 108, which in turn provides the variable pressure to the second control fluid inlet 118 of the pneumatic signal amplifier 106 in the form of the input control signal 126.

The pressure at which the pressurized control fluid and/or the input control signal 126 is supplied to the second control fluid inlet 118 of the pneumatic signal amplifier 106 and/or to the control fluid inlet 112 of the actuator 104 causes a corresponding movement of the stem and/or piston of the actuator 104. A force and/or load generated by the stern and/or piston of the actuator 104 is transformed into a force and/or load on the valve shaft of the valve 102, which causes the flow control member 110 of the valve 102 to open or close. As described above, the relative movement of the stem and/or piston of the actuator 104 and/or the flow control member 110 of the valve 102 is conveyed by the position indicator 114 of the actuator 104 to the position sensor 138 of the valve controller 108, thus providing a continuous feedback loop that may be used to update and/or adjust the variable current drive signal 146.

Although not shown in FIG. 1, in operation of the known valve system 100, the pressurized control fluid source 124 is fluidly coupled to the first control fluid inlet 116 of the pneumatic signal amplifier 106 via a conduit. Another conduit fluidly couples the pressurized control fluid source 124 to the control fluid inlet 128 of the valve controller 108. Yet another conduit fluidly couples the control fluid outlet 130 of the valve controller 108 to the second control fluid inlet 118 of the pneumatic signal amplifier 106. Yet another conduit fluidly couples the control fluid outlet 120 of the pneumatic signal amplifier 106 to the control fluid inlet 112 of the actuator 104.

Figure 2:
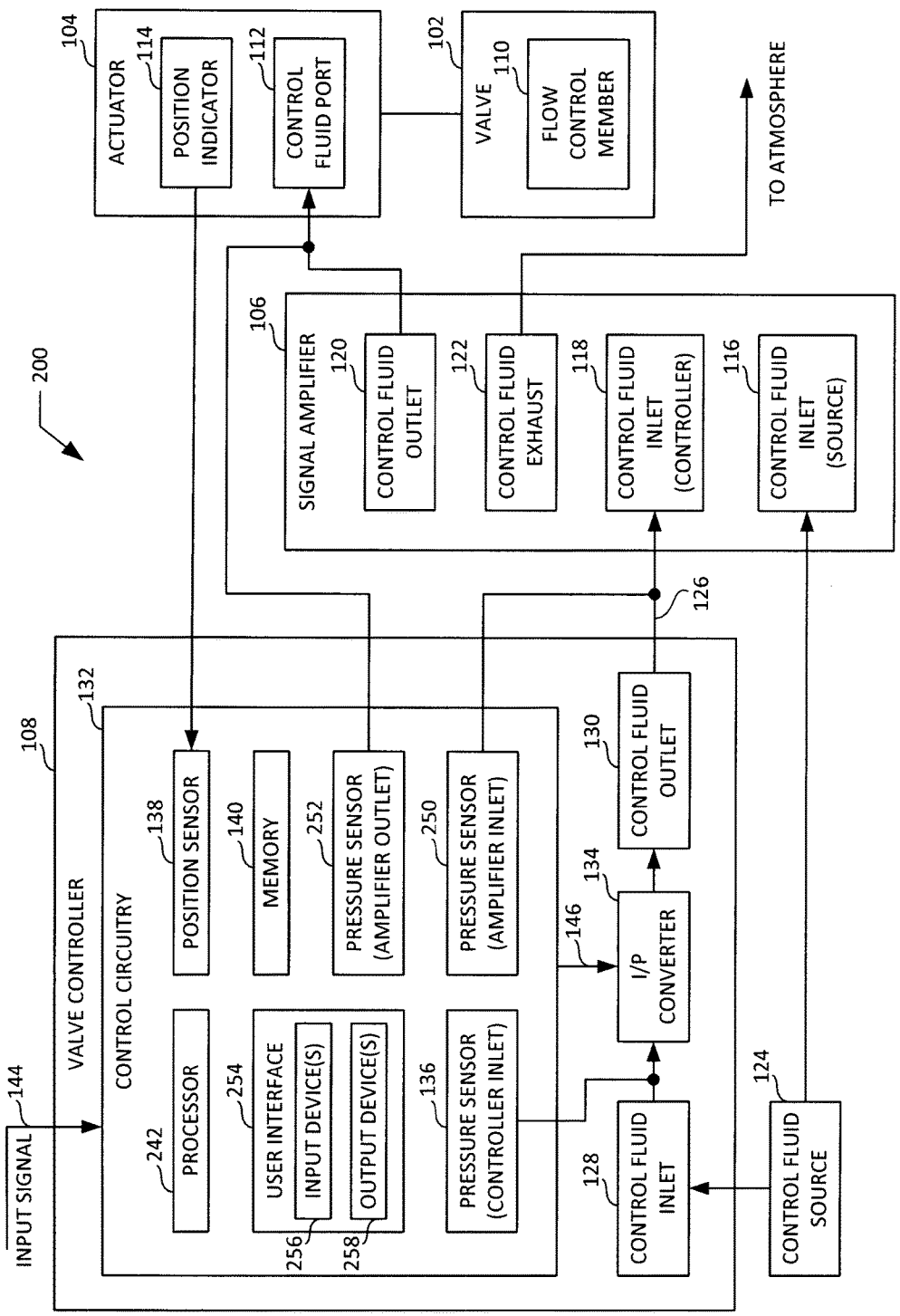
FIG. 2 is a block diagram of an example valve system constructed in accordance with the teachings of this disclosure for conducting in-service testing of a pneumatic signal amplifier.
Figure 3:
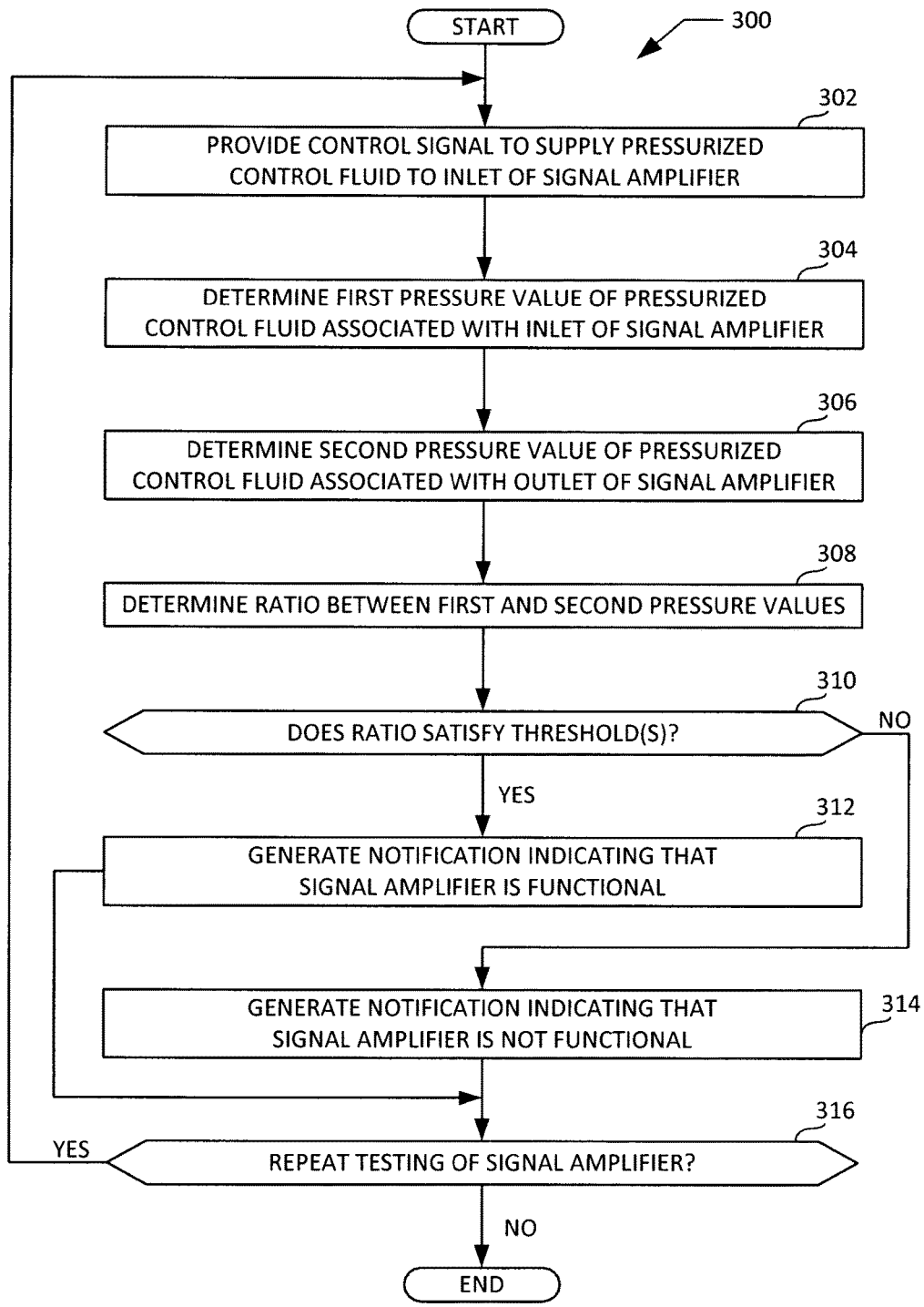
FIG. 3 is a flowchart representative of an example method that may be executed at the example valve controller of FIG. 2 to conduct in-service testing of the pneumatic signal amplifier of FIG. 2.
Figure 4:
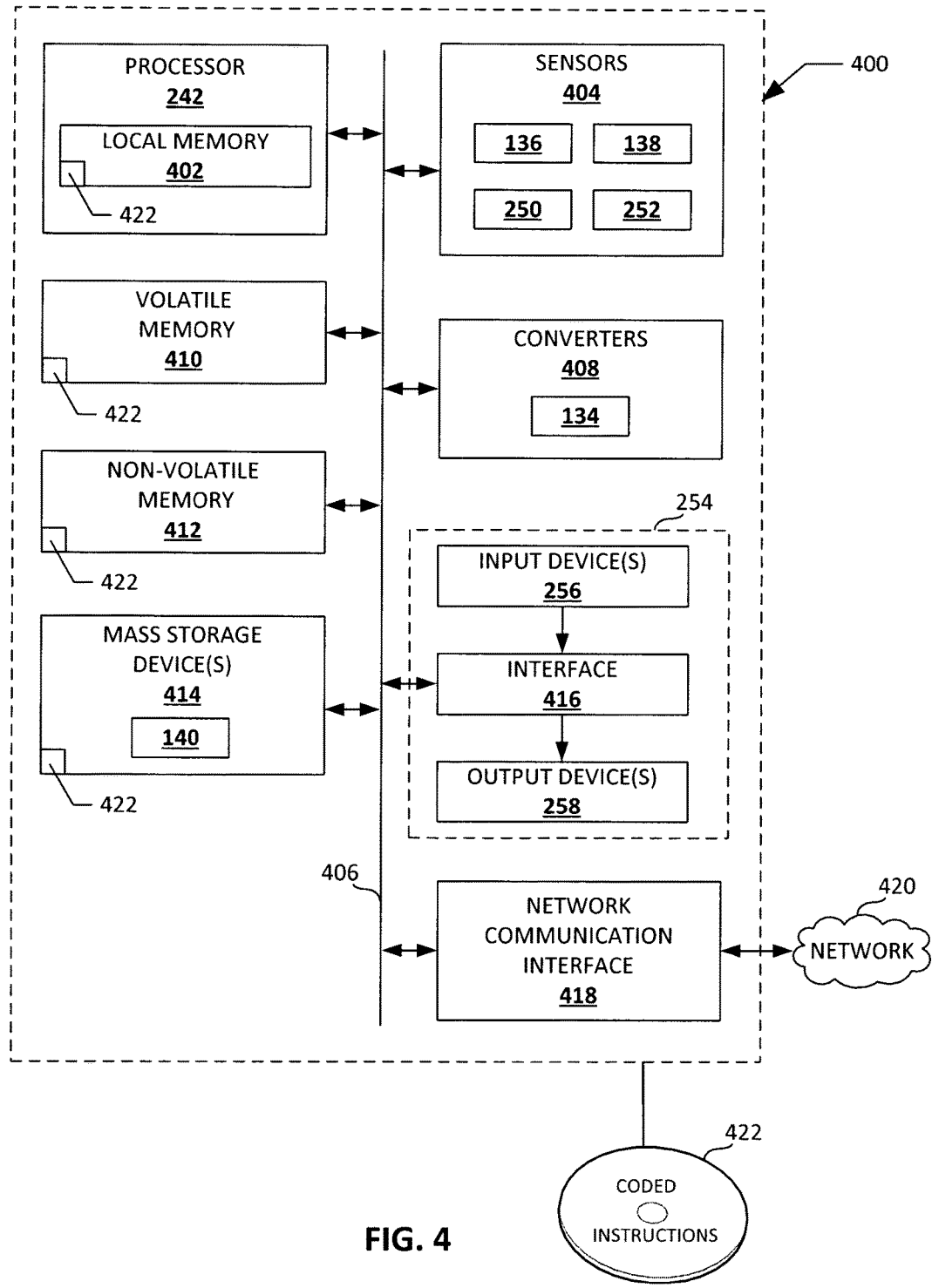
FIG. 4 is an example processor platform capable of executing instructions to implement the method of FIG. 3 and the example valve controller 108 of FIG. 2.

In the known valve system 100 described above in connection with FIG. 1, testing of the pneumatic signal amplifier 106 may be conducted only upon taking the pneumatic signal amplifier 106 and/or the valve 102 out of service. However, taking the pneumatic signal amplifier 106 and/or the valve 102 out of service is costly and inconvenient, and may also result in the pneumatic signal amplifier 106 and/or the valve 102 being unable to perform their intended functions when needed, such as in the case of an emergency requiring the valve 102 to be rapidly closed or rapidly opened without delay. In contrast to the known valve system 100 described above in connection with FIG. 1, the example valve system described herein in connection with FIGS. 2-4 provides the ability to conduct in-service testing of a pneumatic signal amplifier such as the pneumatic signal amplifier 106 of FIG. 1. As a result, the costs, inconveniences and other difficulties associated with taking the pneumatic signal amplifier 106 and/or the valve 102 of FIG. 1 out of service (e.g., as would be required when testing the pneumatic signal amplifier 106 of the known valve system 100) are avoided.

FIG. 2 is a block diagram of an example valve system 200 constructed in accordance with the teachings of this disclosure for conducting in-service testing of a pneumatic signal amplifier. In the illustrated example of FIG. 2, the example valve system 200 includes the components of the known valve system 100 described above in connection with FIG. 1, and further includes an example processor 242 (in addition to and/or in the place of the processor 142 of the known valve system 100 of FIG. 1) that performs the operations of the processor 142 of the known valve system 100 described above as well as additional operations described herein. The example valve system 200 further includes an example amplifier inlet pressure sensor 250, an example amplifier outlet pressure sensor 252 and an example user interface 254.

In the illustrated example of FIG. 2, the amplifier inlet pressure sensor 250 and the amplifier outlet pressure sensor 252 are integrated within the valve controller 108 and, more specifically, within the control circuitry 132 of the valve controller 108. The amplifier inlet pressure sensor 250 senses, measures and/or detects the pressure of the pressurized control fluid and/or the input control signal 126 supplied from the control fluid outlet 130 of the valve controller 108 to the second control fluid inlet 118 of the pneumatic signal amplifier 106. The amplifier outlet pressure sensor 252 senses, measures and/or detects the pressure of the pressurized control fluid supplied from the control fluid outlet 120 of the pneumatic signal amplifier 106 to the control fluid inlet 112 of the actuator 104. Thus, the pressure sensed, measured and/or detected by the amplifier inlet pressure sensor 250 may be compared to the pressure sensed, measured and/or detected by the amplifier outlet pressure sensor 252 to determine a pressure differential across the pneumatic signal amplifier 106.

In some examples, the processor 242 of FIG. 2 may cause the amplifier inlet pressure sensor 250 to sense, measure and/or detect the pressure of the pressurized control fluid and/or the input control signal 126 supplied to the second control fluid inlet 118 of the pneumatic signal amplifier 106 at a first time, and may further cause the amplifier outlet pressure sensor 252 to sense, measure and/or detect the pressure of the pressurized control fluid supplied from the control fluid outlet 120 of the pneumatic signal amplifier 106 at a second time that is subsequent to the first time. In some examples, the difference and/or delay between the first and second times may correspond to a known, predetermined and/or designated duration of time needed for the pneumatic signal amplifier 106 to provide a proper functional response (e.g., a timely amplification) to a known and/or predetermined change in the input control signal 126 received by the pneumatic signal amplifier 106. For example, if the pneumatic signal amplifier 106, when functioning properly, takes one second (1 s) to suitably amplify a known change in the input control signal 126, the processor 242 may cause the amplifier outlet pressure sensor 252 to sense, measure and/or detect the pressure of the pressurized control fluid supplied from the control fluid outlet 120 of the pneumatic signal amplifier 106 at a second time that is one second (1 s) subsequent to a first time at which the processor 242 causes the amplifier inlet pressure sensor 250 to sense, measure and/or detect the pressure of the pressurized control fluid and/or the input control signal 126 supplied to the second control fluid inlet 118 of the pneumatic signal amplifier 106.

Pressure values sensed, measured and/or detected by the amplifier inlet pressure sensor 250 and/or the amplifier outlet pressure sensor may be stored in the memory 140 of FIG. 2. The processor 242 of FIG. 2 may access data and/or information from the memory 140 of FIG. 2, or may alternatively receive data and/or information directly from the controller inlet pressure sensor 136, the position sensor 138, the amplifier inlet pressure sensor 250, the amplifier outlet pressure sensor 252 and/or the user interface 254 of FIG. 2.

In the illustrated example of FIG. 2, the processor 242 compares a pressure value sensed, measured and/or detected by the amplifier inlet pressure sensor 250 to a pressure value sensed, measured and/or detected by the amplifier outlet pressure sensor 252 to determine a ratio value between the two pressure values. In some examples, the processor 242 determines the ratio value between the pressure value sensed, measured and/or detected by the amplifier inlet pressure sensor 250 and the pressure value sensed, measured and/or detected by the amplifier outlet pressure sensor 252 by dividing the pressure value sensed, measured and/or detected by the amplifier inlet pressure sensor 250 by the pressure value sensed, measured and/or detected by the amplifier outlet pressure sensor 252.

For example, if the pressure value sensed, measured and/or detected by the amplifier inlet pressure sensor 250 is equal to the pressure value sensed, measured and/or detected by the amplifier outlet pressure sensor 252, the ratio between the two pressure values is 1:1, and the processor 242 of FIG. 2 determines that the two pressure values have a ratio value equal to 1.0 (e.g., 1/1=1.0). As another example, if the pressure value sensed, measured and/or detected by the amplifier inlet pressure sensor 250 is double the pressure value sensed, measured and/or detected by the amplifier outlet pressure sensor 252, the ratio between the two pressure values is 2:1, and the processor 242 of FIG. 2 determines that the two pressure values have a ratio value equal to 2.0 (e.g., 2/1=2.0). As yet another example, if the pressure value sensed, measured and/or detected by the amplifier inlet pressure sensor 250 is half the pressure value sensed, measured and/or detected by the amplifier outlet pressure sensor 252, the ratio between the two pressure values is 1:2, and the processor 242 of FIG. 2 determines that the two pressure values have a ratio value equal to 0.5 (1/2=0.5).

The ratio value determined by the processor 242 of FIG. 2 may be indicative of the functionality and/or functional status of the pneumatic signal amplifier 106 of FIG. 2. For example, it may be expected that the ratio value determined by the processor 242 is within a known and/or predetermined range of ratio values when the pneumatic signal amplifier 106 is functioning properly. Thus, a determined ratio value (e.g., determined via the processor 242 of FIG. 2) falling within the known and/or predetermined range of ratio values may indicate that the pneumatic signal amplifier 106 is functioning properly, while a determined ratio value falling outside of the known and/or predetermined range of ratio values may instead indicate that the pneumatic signal amplifier 106 is not functioning properly.

The processor 242 of FIG. 2 compares the determined ratio value associated with pressure values respectively sensed, measured and/or detected by the amplifier inlet pressure sensor 250 and the amplifier outlet pressure sensor 252 to one or more threshold(s) to determine whether the ratio value satisfies the threshold(s) (e.g., whether the ratio value is below an upper bound or upper threshold and/or above a lower bound or lower threshold). If the processor 242 determines that the ratio value satisfies the threshold(s), such a determination is indicative of the pneumatic signal amplifier 106 of FIG. 2 functioning properly. For example, a determination by the processor 242 that the ratio value satisfies the threshold(s) may indicate that the pneumatic signal amplifier 106 is sufficiently increasing the speed at which the stem and/or piston of the actuator 104 moves and/or strokes to open and/or close the flow control member 110 of the valve 102. If the processor 242 instead determines that the ratio value does not satisfy the threshold(s), such a determination is indicative of the pneumatic signal amplifier 106 of FIG. 2 not functioning properly. For example, a determination by the processor 242 that the ratio value does not satisfy the threshold(s) may indicate that the pneumatic signal amplifier 106 is not sufficiently increasing the speed at which the stem and/or piston of the actuator 104 moves and/or strokes to open and/or close the flow control member 110 of the valve 102.

The processor 242 of FIG. 2 may generate one or more notification(s) and/or message(s) identifying the determined functionality and/or functional status of the pneumatic signal amplifier 106. For example, if the processor 242 determines that the ratio value satisfies the threshold(s), the processor 242 may generate one or more notification(s) and/or message(s) indicating that the pneumatic signal amplifier 106 is functional and/or that the pneumatic signal amplifier 106 is functioning properly. As another example, if the processor 242 instead determines that the ratio value does not satisfy the threshold(s), the processor 242 may generate one or more notification(s) and/or message(s) indicating that the pneumatic signal amplifier 106 is not functional and/or that the pneumatic signal amplifier 106 is not functioning properly.

In some examples, the processor 242 controls the sensing, measuring and/or detecting of respective pressures and/or pressure values by the amplifier inlet pressure sensor 250 and/or the amplifier outlet pressure sensor 252, determines a ratio value between the pressure value sensed, measured and/or detected by the amplifier inlet pressure sensor 250 and the pressure value sensed, measured and/or detected by the amplifier outlet pressure sensor 252, determines whether the ratio value satisfies one or more threshold(s), and generates one or more notification(s) and/or message(s) identifying a determined functionality and/or functional status of the pneumatic signal amplifier 106, all pursuant to an in-service test and/or an in-service test protocol for the pneumatic signal amplifier 106 conducted in conjunction with the valve system 200 of FIG. 2. In some examples, the processor 242 controls and/or manages the in-service testing of the pneumatic signal amplifier 106 based on and/or in response to a test initiation signal. As used herein, the term "test initiation signal" means one or more signal(s), message(s), instruction(s) and/or notification(s) received, obtained and/or accessed by the processor 242 of the valve controller 108 that cause(s) the processor 242 to initiate an in-service test and/or in-service testing of a pneumatic signal amplifier (e.g., the pneumatic signal amplifier 106 of FIG. 2) of a valve system (e.g., the valve system 200 of FIG. 2). In some examples, the test initiation signal may cause the processor 242 to conduct a partial stroke test of the valve 102 of FIG. 2 and/or, more generally, of the valve system 200 of FIG. 2, during which the functionality of the pneumatic signal amplifier 106 of FIG. 2 may be tested, evaluated and/or determined While the pneumatic signal amplifier 106, the valve 102 and/or, more generally, the valve system 200 remain(s) in service.

In some examples, the test initiation signal may constitute, replace and/or modify the example input signal 144 received by the control circuitry 132 of the valve controller 108 of FIG. 2. In other examples, the processor 242 and/or, more generally, the control circuitry of FIG. 2, may receive the test initiation signal from the user interface 254 of FIG. 2, as described below. In some examples, the processor 242 may obtain and/or access the test initiation signal from the memory 140 of FIG. 2. In sonic examples, the test initiation signal causes the processor 242 to effect a known and/or predetermined change to the pressure associated with the input control signal 126 of FIG. 2. For example, the test initiation signal may cause the control circuitry 132, via the processor 242 of FIG. 2, to generate a drive signal 146 corresponding to a known and/or predetermined increase or decrease to the pressure at which the pressurized control fluid is supplied from the control fluid outlet 130 of the valve controller 108 of FIG. 2 to the second control fluid inlet 118 of the pneumatic signal amplifier 106 of FIG. 2. In some examples, the known and/or predetermined increase or decrease is relative to a setpoint (e.g., a pressure setpoint or a position setpoint) associated with the pressurized control fluid being supplied to the second control fluid inlet 118 of the pneumatic signal amplifier 106 while the in-service testing is not being conducted.

In some examples, the processor 242 of FIG. 2 conducts a partial stroke test of the valve 102 of FIG. 2 and/or, more generally, of the valve system 200 of FIG. 2, to test, evaluate and/or determine the functionality of the pneumatic signal amplifier 106 of FIG. 2 based on the above-described travel control process(es) and/or technique(s) in which the processor 242 and/or, more generally, the valve controller 108 of FIG. 2, via the position sensor 138 of FIG. 2, receives positional information (e.g., position and/or travel feedback) from the position indicator 114 of the actuator 104 of FIG. 2. In such examples, the flow control member 110 of the valve 102 of FIG. 2, and/or the internal stem and/or piston of the actuator 106 of FIG. 2, typically moves(s) and/or travel(s) in conjunction with conducting the partial stroke test.

In other examples, it may be undesirable for the flow control member 110 of the valve 102 of FIG. 2, and/or the internal stem and/or piston of the actuator 106 of FIG. 2, to move and/or travel conjunction with conducting the partial stroke test. In such other examples, the processor 242 of FIG. 2 may conduct the partial stroke test by additionally and/or alternatively implementing one or more pressure control process(es) and/or technique(s) as described in U.S. patent application Ser. No. 15/066,495 filed on Mar. 10, 2016 and entitled "Pressure Control for Partial Stroke Tests," and U.S. Patent Application No. 62/135,377 filed on Mar. 19, 2015 and entitled "Pressure Control for Partial Stroke Tests," both of which are incorporated by reference herein in their entirety. In some such examples, the processor 242 of FIG. 2 may implement such pressure control process(es and/or technique(s) by: controlling a pressure within the actuator 104 of FIG. 2 to ramp from an initial pressure towards a pre-determined pressure limit monitoring the position of the flow control member 110 of the valve 102 of FIG. 2 and/or the internal stem and/or piston of the actuator 106 of FIG. 2 to detect a movement thereof; and upon one of the pressure within the actuator 104 reaching the pressure limit or detecting the movement of the flow control member 110 of the valve 102 of FIG. 2 and/or the internal stem and/or piston of the actuator 106 of FIG. 2, controlling the pressure within the actuator 104 to return to the initial pressure. Thus, when utilizing pressure control process(es) and/or technique(s) such as those described in U.S. patent application Ser. No. 15/066,495 and U.S. Patent Application No. 62/135,377, the processor 242 of FIG. 2 may advantageously conduct a partial stroke test of the valve 102 of FIG. 2 and/or, more generally, of the valve system 200 of FIG. 2, to test, evaluate and/or determine the functionality of the pneumatic signal amplifier 106 of FIG. 2, without moving and/or actuating the flow control member 110 of the valve 102 of FIG. 2 and/or the internal stein and/or piston of the actuator 106 of FIG. 2.

Returning to the example of FIG. 2, the user interface 254 of FIG. 2 facilitates interactions and/or communications between a user of the valve system 200 of FIG. 2 and the processor 242 of FIG. 2. Data and/or information that is presented and/or received via the user interface 254 may be of any type, form and/or format, and may be stored in a computer-readable storage medium such as the memory 140 described above. The user interface 254 includes one or more input device(s) 256 via which the user may input information and/or data to the processor 242, and/or, more generally, to the valve controller 108 of FIG. 2. For example, the user interface 254 may include one or more buttons, one or more switches, a keyboard, a mouse, a microphone and/or a liquid crystal display having a touchscreen that enable(s) the user to convey data and/or commands to the processor 242, and/or, more generally, to the valve controller 108. In some examples, the test initiation signal described above may be generated via the user interface 254 in response to one or more input(s) by a user to the one or more input device(s) 256 of the user interface 254.

The user interface 254 also includes one or more output device(s) 258 via which the processor 242, and/or, more generally, the valve controller 108 presents information and/or data in visual and/or audible form to the user of the vehicle. For example, the user interface 254 may include one or more light emitting diode(s) for presenting visual information, one or more speaker(s) for presenting audible information, and/or a display device (e.g., a liquid crystal display, a cathode ray tube display, etc.) for presenting textual and/or graphical information. In some examples, the notification(s) and/or messages(s) generated by the processor 242 associated with the determined functionality and/or the determined functional status of the pneumatic signal amplifier 106 may be presented via the one or more output device(s) 258 of the user interface 254.

While an example manner of implementing the example valve system 200 is illustrated in FIG. 2, one or more of the elements, processes and/or devices illustrated in FIG. 2 may be combined, divided, re-arranged, omitted, eliminated and/or implemented in any other way. Further, the position indicator 114, the I/P converter 134, the controller inlet pressure sensor 136, the position sensor 138, the memory 140, the example processor 242, the example amplifier inlet pressure sensor 250, the example amplifier outlet pressure sensor 252 and/or the example user interface 254 of FIG. 2 may be implemented by hardware, software, firmware and/or any combination of hardware, software and/or firmware. Thus, for example, any of the position indicator 114, the I/P converter 134, the controller inlet pressure sensor 136, the position sensor 138, the memory 140, the example processor 242, the example amplifier inlet pressure sensor 250, the example amplifier outlet pressure sensor 252 and/or the example user interface 254 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the position indicator 114, the I/P converter 134, the controller inlet pressure sensor 136, the position sensor 138, the memory 140, the example processor 242, the example amplifier inlet pressure sensor 250, the example amplifier outlet pressure sensor 252 and/or the example user interface 254 is/are hereby expressly defined to include a tangible computer readable storage device or storage disk such as a memory, a digital versatile disk (DVD), a compact disk (CD), a Blu-ray disk, etc. storing the software and/or firmware. Further still, the example valve system 200 of FIG. 2 may include one or more elements, processes and/or devices in addition to, or instead of, those illustrated in FIG. 2, and/or may include more than one of any or all of the illustrated elements, processes and devices.

A flowchart representative of an example method for conducting in-service testing of the pneumatic signal amplifier 106 of FIG. 2 is shown in FIG. 3. In this example, the method may be implemented using machine-readable instructions that comprise one or more program(s) for execution by a controller or processor such as the example processor 242 of FIG. 2 described above and shown in the example processor platform 400 discussed below in connection with FIG. 4. The one or more program(s) may be embodied in software stored on a tangible computer readable storage medium such as a CD-ROM, a floppy disk, a hard drive, a digital versatile disk (DVD), a Blu-ray disk, or a memory associated with the processor 242, but the entire program(s) and/or parts thereof could alternatively be executed by a device other than the processor 242 and/or embodied in firmware or dedicated hardware. Further, although the example program(s) is/are described with reference to the flowchart illustrated in FIG. 3, many other methods for conducting in-service testing of the pneumatic signal amplifier 106 of FIG. 2 may alternatively be used. For example, the order of execution of the blocks may be changed, and/or some of the blocks described may be changed, eliminated, or combined.

As mentioned above, the example method of FIG. 3 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 3 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flowchart representative of an example method 300 that may be executed at the example valve controller 108 of FIG. 2 to conduct in-service testing of the pneumatic signal amplifier 106 of FIG. 2. The example method 300 of FIG. 3 begins when the processor 242 of FIG. 2 provides an input control signal 126 to supply pressurized control fluid to the second control fluid inlet 118 of the pneumatic signal amplifier 106 of FIG. 2 (block 302). In some examples, the input control signal 126 is supplied to the second control fluid inlet 118 of the pneumatic signal amplifier 106 in conjunction with a test initiation signal that causes the processor 242 to initiate in-service testing of the pneumatic signal amplifier 106. In some examples, the test initiation signal and/or the input control signal 126 correspond(s) to a known and/or predetermined increase or decrease to a pressure at which the pressurized control fluid is supplied to the second control fluid inlet 118 of the pneumatic signal amplifier 106. In some examples, the known and/or predetermined increase or decrease is relative to a setpoint (e.g., a pressure setpoint or a position setpoint) associated with the pressurized control fluid being supplied to the second control fluid inlet 118 of the pneumatic signal amplifier 106 while the in-service testing is not being conducted.

The processor 242 of FIG. 2 determines a first pressure value of the pressurized control fluid associated with the second control fluid inlet 118 of the pneumatic signal amplifier 106 of FIG. 2 (block 304). For example, the processor 242 may determine a first pressure value of the pressurized control fluid associated with the second control fluid inlet 118 of the pneumatic signal amplifier 106 based on data and/or information sensed, measured and/or detected by the amplifier inlet pressure sensor 250 of FIG. 2.

The processor 242 of FIG. 2 determines a second pressure value of the pressurized control fluid associated with the control fluid outlet 120 of the pneumatic signal amplifier 106 of FIG. 2 (block 306). For example, the processor 242 may determine a second pressure value of the pressurized control fluid associated with the control fluid outlet 120 of the pneumatic signal amplifier 106 based on data and/or information sensed, measured and/or detected by the amplifier outlet pressure sensor 252 of FIG. 2. In some examples, the processor 242 may cause the amplifier outlet pressure sensor 252 to sense, measure and/or detect the pressure of the pressurized control fluid supplied from the control fluid outlet 120 of the pneumatic signal amplifier 106 at a second time that is subsequent to a first time at which the processor 242 caused the amplifier inlet pressure sensor 250 to sense, measure and/or detect the pressure of the pressurized control fluid supplied to the second control fluid inlet 118 of the pneumatic signal amplifier 106. In some examples, the difference and/or delay between the first and second times may correspond to a known, predetermined and/or designated duration of time needed for the pneumatic signal amplifier 106 to provide a proper functional response (e.g., a timely amplification) to the input control signal 126 supplied to the pneumatic signal amplifier 106.

The processor 242 of FIG. 2 compares the first pressure value to the second pressure value to determine a ratio value between the first and second pressure values (block 308). For example, the processor may determine the ratio value between the first and second pressure values by dividing the first pressure value by the second pressure value.

The processor 242 of FIG. 2 determines whether the ratio value satisfies one or more threshold(s) (e.g., whether the ratio value is below an upper threshold and/or above a lower threshold) (block 310). For example, the processor 242 may determine that the ratio value is both below an upper threshold and above a lower threshold, thereby satisfying the threshold(s) (e.g., falling within a range). A determination at block 310 that the ratio value satisfies the threshold.(s) indicates that the pneumatic signal amplifier 106 of FIG. 2 is functional and/or is functioning properly. A determination at block 310 that the ratio value does not satisfy the threshold(s) indicates that the pneumatic signal amplifier 106 of FIG. 2 is not functional and/or is not functioning properly. If the processor 242 determines at block 310 that the ratio value satisfies the threshold(s), control of the example method 300 proceeds to block 312. If the processor 242 instead determines at block 310 that the ratio value does not satisfy the threshold(s), control of the example method 300 proceeds to block 314.

At block 312, the processor 242 of FIG. 2 generates one or more notification(s) and/or message(s) indicating that the pneumatic signal amplifier 106 of FIG. 2 is functional and/or that the pneumatic signal amplifier 106 of FIG. 2 is functioning properly (block 312). In some examples, the one or more notification(s) and/or message(s) generated by the processor 242 at block 312 indicate(s) that the pneumatic signal amplifier 106 of FIG. 2 is sufficiently increasing the speed at which the stem and/or piston of the actuator 104 of FIG. 2 moves and/or strokes to open and/or close the flow control member 110 of the valve 102 of FIG. 2. In some examples, the processor 242 may cause the one or more notification(s) and/or message(s) generated by the processor 242 at block 312 to be presented via one or more of the output device(s) 258 of the user interface 254 of FIG. 2.

At block 314, the processor 242 of FIG. 2 generates one or more notification(s) and/or message(s) indicating that the pneumatic signal amplifier 106 of FIG. 2 is not functional and/or that the pneumatic signal amplifier 106 of FIG. 2 is not functioning properly (block 312). In some examples, the one or more notification(s) and/or message(s) generated by the processor 242 at block 314 indicate(s) that the pneumatic signal amplifier 106 of FIG. 2 is not sufficiently increasing the speed at which the stem and/or piston of the actuator 104 of FIG. 2 moves and/or strokes to open and/or close the flow control member 110 of the valve 102 of FIG. 2. In some examples, the processor 242 may cause the one or more notification(s) and/or message(s) generated by the processor 242 at block 314 to be presented via one or more of the output device(s) 258 of the user interface 254 of FIG. 2.

At block 316, the processor 242 of FIG. 2 determines whether the in-service testing of the pneumatic signal amplifier 106 of FIG. 2 is to be repeated (block 316). For example, the processor 242 may receive one or more input(s), notification(s) and/or message(s) via the user interface 254 of FIG. 2 indicating that the in-service testing of the pneumatic signal amplifier 106 is to be repeated. If the processor 242 determines at block 316 that the in-service testing of the pneumatic signal amplifier 106 is to be repeated, control of the example method 300 returns to block 302. If the processor 242 instead determines at block 316 that the in-service testing of the pneumatic signal amplifier 106 is not to be repeated, the example method 300 ends.

FIG. 4 is an example processor platform 400 capable of executing instructions to implement the method of FIG. 3 and the example valve controller 108 of FIG. 2. The processor platform 400 of the illustrated example includes the example processor 242 of FIG. 2. The processor 242 of the illustrated example is hardware. For example, the processor 242 can be implemented by one or more integrated circuits, logic circuits, microprocessors or controllers from any desired family or manufacturer. The processor 242 of the illustrated example includes a local memory 402 (e.g., a cache).

The processor 242 of the illustrated example is in communication with one or more example sensors 404 via a bus 406. The example sensors 404 include the controller inlet pressure sensor 136 and the position sensor 138 of FIGS. 1 and 2, as well as the example amplifier inlet pressure sensor 250 and the example amplifier outlet pressure sensor 252 of FIG. 2.

The processor 242 of the illustrated example is also in communication with one or more example signal converters 408 via the bus 406. The example signal converters 408 include the I/P converter 134 of FIGS. 1 and 2.

The processor 242 of the illustrated example is also in communication with a main memory including a volatile memory 410 and a non-volatile memory 412 via the bus 406. The volatile memory 410 may he implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 412 may be implemented by flash memory and/or any other desired type of memory device. Access to the volatile memory 410 and the non-volatile memory 412 is controlled by a memory controller.

The processor 242 of the illustrated example is also in communication with one or more mass storage devices 414 for storing software and/or data. Examples of such mass storage devices 414 include floppy disk drives, hard drive disks, compact disk drives, Blu-ray disk drives, RAID systems, and digital versatile disk (DVD) drives. In the illustrated example, the mass storage device 414 includes the example memory 140 of FIG. 2.

The processor platform 400 of the illustrated example also includes an interface circuit 416. The interface circuit 416 may be implemented by any type of interface standard, such as an Ethernet interface, a universal serial bus (USB), and/or a PCI express interface. In the illustrated example, one or more of the example input device(s) 256 of FIG. 2 are connected to the interface circuit 416. The input device(s) 256 permit(s) a user to enter data and commands into the processor 242. The input device(s) 256 can be implemented by, for example, one or more buttons, one or more switches, a keyboard, a mouse, a microphone and/or a liquid crystal display having a touchscreen. One or more of the example output device(s) 258 of FIG. 2 are also connected to the interface circuit 416 of the illustrated example. The output device(s) 258 can be implemented, for example, by one or more light emitting diode(s) for presenting visual information, one or more speaker(s) for presenting audible information, and/or a display device (e.g., a liquid crystal display, a cathode ray tube display, etc.) for presenting textual and/or graphical information. The interface circuit 416 of the illustrated example may, thus, include a graphics driver such as a graphics driver chip and/or processor. In the illustrated example, the input device(s) 256, the output device(s) 258 and the interface circuit 416 collectively form the example user interface 254 of FIG. 2.

The processor platform 400 of the illustrated example also includes a network communication interface circuit 418 to facilitate the exchange of data and/or signals with external machines via a network 420. In some examples, the network 420 may be facilitated via 4-20 mA wiring and/or via one or more communication protocol(s) including, for example, Foundation Fieldbus, Highway Addressable Remote Transducer (HART), Transmission Control Protocol/Internet Protocol (TCP/IP), Profinet, Modbus and/or Ethernet.

Coded instructions 422 for implementing the method of FIG. 3 may be stored in the local memory 402, in the volatile memory 410, in the non-volatile memory 412, in the mass storage device 414, and/or on a removable tangible computer readable storage medium such as a CD or DVD.

From the foregoing, it will be appreciated that the disclosed methods, apparatus and systems advantageously provide the ability to conduct in-service testing of a pneumatic signal amplifier of a valve system. As a result, the costs, inconveniences and other difficulties associated with taking the pneumatic signal amplifier and/or a valve of the valve system out of service, as would typically be required when testing the functionality of the pneumatic signal amplifier, are avoided.

In sonic disclosed examples, a method for conducting in-service testing of a pneumatic signal amplifier operatively coupled to a valve controller and to an actuator comprises supplying, by executing one or more instructions with a processor of the valve controller in response to a test initiation signal, a pressurized control fluid to an inlet of the pneumatic signal amplifier. In some disclosed examples, the pneumatic signal amplifier is a volume booster. In some disclosed examples, the actuator is a single-acting actuator operatively coupled to a valve. In some disclosed examples, the actuator is one of a diaphragm actuator or a piston actuator.

In some disclosed examples, the method comprises determining, by executing one or more instructions with the processor, a first pressure value of the pressurized control fluid, the first pressure value corresponding to an inlet pressure of the pressurized control fluid at the inlet of the pneumatic signal amplifier. In some disclosed examples, the determining of the first pressure value comprises measuring the inlet pressure of the pressurized control fluid at the inlet of the pneumatic signal amplifier via a fist pressure sensor. In some disclosed examples, the method comprises determining, by executing one or more instructions with the processor, a second pressure value of the pressurized control fluid, the second pressure value corresponding to an outlet pressure of the pressurized control fluid at an outlet of the pneumatic signal amplifier. In some disclosed examples, the determining of the second pressure value comprises measuring the outlet pressure of the pressurized control fluid at the outlet of the pneumatic signal amplifier via a second pressure sensor.

In some disclosed examples, the method comprises determining, by executing one or more instructions with the processor, a ratio value between the first and second pressure values. In some disclosed examples, the determining of the ratio value comprises dividing the first pressure value by the second pressure value. In some disclosed examples, the method comprises determining, by executing one or instructions with the processor, whether the ratio value satisfies a threshold. In some disclosed examples, the method comprises, in response to determining that the ratio value satisfies the threshold, generating, by executing one or more instructions with the processor, a notification indicating that the pneumatic signal amplifier is functional. In some disclosed examples, the method comprises, in response to determining that the ratio value does not satisfy the threshold, generating, by executing one or more instructions with the processor, a notification indicating that the pneumatic signal amplifier is not functional.

In some disclosed examples, an apparatus for conducting in-service testing of a pneumatic signal amplifier comprises a valve controller configured to be operatively coupled to the pneumatic signal amplifier and to an actuator. In some disclosed examples, the valve controller of the apparatus comprises a processor configured to supply a pressurized control fluid to an inlet of the pneumatic signal amplifier in response to a test initiation signal. In some disclosed examples, the pneumatic signal amplifier is a volume booster. In some disclosed examples, the actuator is a single-acting actuator operatively coupled to a valve. In some disclosed examples, the actuator is one of a diaphragm actuator or a piston actuator.

In some disclosed examples, the processor of the valve controller is configured to determine a first pressure value of the pressurized control fluid, the first pressure value corresponding to an inlet pressure of the pressurized control fluid at the inlet of the pneumatic signal amplifier. In some disclosed examples, the determining of the first pressure value comprises measuring the inlet pressure of the pressurized control fluid at the inlet of the pneumatic signal amplifier via a fist pressure sensor. In some disclosed examples, the processor of the valve controller is configured to determine a second pressure value of the pressurized control fluid, the second pressure value corresponding to an outlet pressure of the pressurized control fluid at an outlet of the pneumatic signal amplifier. In some disclosed examples, the determining of the second pressure value comprises measuring the outlet pressure of the pressurized control fluid at the outlet of the pneumatic signal amplifier via a second pressure sensor.

In some disclosed examples, the processor of the valve controller is configured to determine a ratio value between the first and second pressure values. In some disclosed examples, the determining of the ratio value comprises dividing the first pressure value by the second pressure value. In some disclosed examples, the processor of the valve controller is configured to determine whether the ratio value satisfies a threshold. In some disclosed examples, the processor of the valve controller is configured to, in response to determining that the ratio value satisfies the threshold, generate a notification indicating that the pneumatic signal amplifier is functional. In some disclosed examples, the processor of the valve controller is configured to, in response to determining that the ratio value does not satisfy the threshold, generate a notification indicating that the pneumatic signal amplifier is not functional.

In some disclosed examples, a tangible machine readable storage medium comprises instructions that, when executed, cause a processor of a valve controller to supply a pressurized control fluid to an inlet of a pneumatic signal amplifier in response to a test initiation signal, the pneumatic signal amplifier being operatively coupled to the valve controller and to an actuator. In some disclosed examples, the pneumatic signal amplifier is a volume booster. In some disclosed examples, the actuator is a single-acting actuator operatively coupled to a valve. In some disclosed examples, the actuator is one of a diaphragm actuator or a piston actuator.

In some disclosed examples, the instructions, when executed, cause the processor of the valve controller to determine a first pressure value of the pressurized control fluid, the first pressure value corresponding to an inlet pressure of the pressurized control fluid at the inlet of the pneumatic signal amplifier. In some disclosed examples, the determining of the first pressure value comprises measuring the inlet pressure of the pressurized control fluid at the inlet of the pneumatic signal amplifier via a fist pressure sensor. In some disclosed examples, the instructions, when executed, cause the processor of the valve controller to determine a second pressure value of the pressurized control fluid, the second pressure value corresponding to an outlet pressure of the pressurized control fluid at an outlet of the pneumatic signal amplifier. In some disclosed examples, the determining of the second pressure value comprises measuring the outlet pressure of the pressurized control fluid at the outlet of the pneumatic signal amplifier via a second pressure sensor.

In some disclosed examples, the instructions, when executed, cause the processor of the valve controller to determine a ratio value between the first and second pressure values. In some disclosed examples, the determining of the ratio value comprises dividing the first pressure value by the second pressure value. In some disclosed examples, the instructions, when executed, cause the processor of the valve controller to determine whether the ratio value satisfies a threshold. In some disclosed examples, the instructions, when executed, cause the processor of the valve controller to, in response to determining that the ratio value satisfies the threshold, generate a notification indicating that the pneumatic signal amplifier is functional. In some disclosed examples, the instructions, when executed, cause the processor of the valve controller to, in response to determining that the ratio value does not satisfy the threshold, generate a notification indicating that the pneumatic signal amplifier is not functional.

Although certain example methods, apparatus, articles of manufacture and systems have been disclosed herein, the scope of coverage of this patent is not limited thereto. On the contrary, this patent covers all methods, apparatus, articles of manufacture and systems fairly falling within the scope of the claims of this patent. For example, although the example methods, apparatus, articles of manufacture and systems disclosed herein make reference to a single-acting actuator, the scope of coverage of this patent extends to methods, apparatus, articles of manufacture and systems implemented in conjunction with a double-acting actuator as well. When implementing such methods, apparatus, articles of manufacture and systems in conjunction with a double-acting actuator, separate pneumatic signal amplifiers may be operatively coupled to respective control fluid inlets of the double-acting actuator, and the valve controller may include respective pairs of an amplifier inlet pressure sensor and an amplifier outlet pressure sensor for each such pneumatic signal amplifier.

What is claimed is:

1. A method for conducting in-service testing of a pneumatic signal amplifier, the method comprising:
    supplying, by executing one or more instructions with a processor of a valve controller in response to a test initiation signal, pressurized control fluid from the valve controller to a first control fluid inlet of the pneumatic signal amplifier, the pneumatic signal amplifier being operatively coupled to and in fluid communication with the valve controller, the pneumatic signal amplifier also being operatively coupled to and in fluid communication with an actuator, the actuator being operatively coupled to a valve to move the valve in response to pressurized control fluid received at the actuator from the pneumatic signal amplifier, the pneumatic signal amplifier further including a second control fluid inlet configured to receive pressurized control fluid from a control fluid source, a control fluid outlet configured to supply pressurized control fluid from the pneumatic signal amplifier to the actuator, and a control fluid exhaust configured to vent excess pressurized control fluid from the pneumatic signal amplifier to an atmosphere, the valve controller including a first pressure sensor and a second pressure sensor;
    determining, by executing one or more instructions with the processor, a first pressure value corresponding to an inlet pressure of the pressurized control fluid at the first control fluid inlet of the pneumatic signal amplifier as measured via the first pressure sensor of the valve controller;
    determining, by executing one or more instructions with the processor, a second pressure value corresponding to an outlet pressure of the pressurized control fluid at the control fluid outlet of the pneumatic signal amplifier as measured via the second pressure sensor of the valve controller;
    determining, by executing one or more instructions with the processor, a ratio value between the first and second pressure values;
    determining, by executing one or more instructions with the processor, whether the ratio value satisfies a threshold; and
    in response to determining that the ratio value satisfies the threshold, generating, by executing one or more instructions with the processor, a notification indicating that the pneumatic signal amplifier is functional.

2. The method of claim 1, further comprising, in response to determining that the ratio value does not satisfy the threshold, generating, by executing one or more instructions with the processor, a notification indicating that the pneumatic signal amplifier is not functional.

3. The method of claim 1, wherein the determining of the ratio value comprises dividing the first pressure value by the second pressure value.

4. The method of claim 1, wherein the pneumatic signal amplifier is a volume booster.

5. The method of claim 1, wherein the actuator is a single-acting actuator operatively coupled to the valve.

6. The method of claim 4, wherein the actuator is one of a diaphragm actuator or a piston actuator.

7. The method of claim 1, wherein the valve controller is to conduct the in-service testing of the pneumatic signal amplifier in association with the valve controller conducting a partial stroke test of the valve.

8. An apparatus for conducting in-service testing of a pneumatic signal amplifier, the apparatus comprising:
    a valve controller operatively coupled to and in fluid communication with the pneumatic signal amplifier, the pneumatic signal amplifier being operatively coupled to and in fluid communication with an actuator, the actuator being operatively coupled to a valve to move the valve in response to pressurized control fluid received at the actuator from the pneumatic signal amplifier, the pneumatic signal amplifier including a first control fluid inlet configured to receive pressurized control fluid from the valve controller, a second control fluid inlet configured to receive pressurized control fluid from a control fluid source, a control fluid outlet configured to supply pressurized control fluid from the pneumatic signal amplifier to the actuator, and a control fluid exhaust configured to vent excess pressurized control fluid from the pneumatic signal amplifier to an atmosphere, the valve controller including a first pressure sensor and a second pressure sensor, the valve controller further including a processor configured to:
    supply pressurized control fluid to the first control fluid inlet of the pneumatic signal amplifier in response to a test initiation signal;
    determine a first pressure value corresponding to an inlet pressure of the pressurized control fluid at the first control fluid inlet of the pneumatic signal amplifier as measured via the first pressure sensor of the valve controller;
    determine a second pressure value corresponding to an outlet pressure of the pressurized control fluid at the control fluid outlet of the pneumatic signal amplifier as measured via the second pressure sensor of the valve controller;
    determine a ratio value between the first and second pressure values;
    determine whether the ratio value satisfies a threshold; and
    in response to determining that the ratio value satisfies the threshold, generate a notification indicating that the pneumatic signal amplifier is functional.

9. The apparatus of claim 8, wherein the processor is further configured to, in response to determining that the ratio value does not satisfy the threshold, generate a notification indicating that the pneumatic signal amplifier is not functional.

10. The apparatus of claim 8, wherein the processor is configured to determine the ratio value by dividing the first pressure value by the second pressure value.

11. The apparatus of claim 8, wherein the pneumatic signal amplifier is a volume booster.

12. The apparatus of claim 8, wherein the actuator is a single-acting actuator operatively coupled to the valve.

13. The apparatus of claim 11, wherein the actuator is one of a diaphragm actuator or a piston actuator.

14. The apparatus of claim 8, wherein the valve controller is to conduct the in-service testing of the pneumatic signal amplifier in association with the valve controller conducting a partial stroke test of the valve.

15. A tangible machine readable storage medium comprising instructions that, when executed, cause a processor of a valve controller configured to conduct in-service testing of a pneumatic signal amplifier to at least:

supply pressurized control fluid from the valve controller to a first control fluid inlet of the pneumatic signal amplifier in response to a test initiation signal, the pneumatic signal amplifier being operatively coupled to and in fluid communication with the valve controller, the pneumatic signal amplifier also being operatively coupled to and in fluid communication with an actuator, the actuator being operatively coupled to a valve to move the valve in response to pressurized control fluid received at the actuator from the pneumatic signal amplifier, the pneumatic signal amplifier further including a second control fluid inlet configured to receive pressurized control fluid from a control fluid source, a control fluid outlet configured to supply pressurized control fluid from the pneumatic signal amplifier to the actuator, and a control fluid exhaust configured to vent excess pressurized control fluid from the pneumatic signal amplifier to an atmosphere, the valve controller including a first pressure sensor and a second pressure sensor;

determine a first pressure value corresponding to an inlet pressure of the pressurized control fluid at the first control fluid inlet of the pneumatic signal amplifier as measured via the first pressure sensor of the valve controller;

determine a second pressure value corresponding to an outlet pressure of the pressurized control fluid at the control fluid outlet of the pneumatic signal amplifier as measured via the second pressure sensor of the valve controller;

determine a ratio value between the first and second pressure values;

determine whether the ratio value satisfies a threshold; and in response to determining that the ratio value satisfies the threshold, generate a notification indicating that the pneumatic signal amplifier is functional.

16. The tangible machine readable storage medium of claim 15, wherein the instructions, when executed, are further to cause the processor to, in response to determining that the ratio value does not satisfy the threshold, generate a notification indicating that the pneumatic signal amplifier is not functional.

17. The tangible machine readable storage medium of claim 15, wherein the instructions, when executed, are to cause the processor to determine the ratio value by dividing the first pressure value by the second pressure value.

18. The tangible machine readable storage medium of claim 15, wherein the pneumatic signal amplifier is a volume booster.

19. The tangible machine readable storage medium of claim 15, wherein the actuator is a single-acting actuator operatively coupled to the valve, the actuator being one of a diaphragm actuator or a piston actuator.

20. The tangible machine readable storage medium of claim 15, wherein the valve controller is to conduct the in-service testing of the pneumatic signal amplifier in association with the valve controller conducting a partial stroke test of the valve.

* * * * *

UNITED STATES PATENT AND TRADEMARK OFFICE
CERTIFICATE OF CORRECTION

PATENT NO. : 10,240,686 B2
APPLICATION NO. : 15/240390
DATED : March 26, 2019
INVENTOR(S) : Afton Renee Coleman It is certified that error appears in the above-identified patent and that said Letters Patent is hereby corrected as shown below:

In the Claims

Column 20, Line 15 (Claim 6): Replace "4" with --5--.

Column 21, Line 8 (Claim 13): Replace "11" with --12--.

Signed and Sealed this
Twenty-seventh Day of August, 2019

Andrei Iancu
*Director of the United States Patent and Trademark Office*